US010482750B2

(12) United States Patent
Taylor et al.

(10) Patent No.: US 10,482,750 B2
(45) Date of Patent: Nov. 19, 2019

(54) SYSTEMS AND METHODS FOR DETERMINING LABEL POSITIONS

(71) Applicant: Walmart Apollo, LLC, Bentonville, AR (US)

(72) Inventors: Robert James Taylor, Rogers, AR (US); Matthew Allen Jones, Bentonville, AR (US); Aaron James Vasgaard, Fayetteville, AR (US); Nicholaus Adam Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/800,632

(22) Filed: Nov. 1, 2017

(65) Prior Publication Data

US 2018/0151052 A1    May 31, 2018

Related U.S. Application Data

(60) Provisional application No. 62/427,537, filed on Nov. 29, 2016.

(51) Int. Cl.
*G08B 21/18* (2006.01)
*G08B 25/08* (2006.01)
(Continued)

(52) U.S. Cl.
CPC ..... *G08B 21/182* (2013.01); *G06F 16/90335* (2019.01); *G06K 9/00* (2013.01);
(Continued)

(58) Field of Classification Search
CPC ..... G08B 21/182; G08B 25/08; H04W 4/023; H04L 67/12; G06K 19/06037;
(Continued)

(56) References Cited

U.S. PATENT DOCUMENTS 5,245,534 A    9/1993    Waterhouse et al.
5,465,085 A *  11/1995   Caldwell ................ G06F 3/147
                                                     235/383
(Continued)

FOREIGN PATENT DOCUMENTS

CN    103366484 A    10/2013

OTHER PUBLICATIONS

International Search Report and Written Opinion from related International Patent Application No. PCT/US2017/058544 dated Jan. 9, 2018.

*Primary Examiner* — Adnan Aziz
(74) *Attorney, Agent, or Firm* — McCarter & English, LLP; David R. Burns

(57) ABSTRACT

Described in detail herein are methods and systems for a label position determination. A label position determination system can include labels mounted on the front face of the shelving units. The labels can include conductive patterns on the back face of the label. The conductive patterns of the labels can be electrically coupled with electrically conductive wires extending along a front face of a shelf. The system can further include a controller coupled to with electrically conductive wires, configured to transmit electrical pulses through the electrically conductive wires. The controller can determine at least one of: an identity of each of the labels mounted to the front face, whether a label has been mounted at an incorrect location on the front face of the shelf, or whether a label is missing from the front face of the shelf based on a response to the electrical pulse.

20 Claims, 7 Drawing Sheets

(51) Int. Cl.
　　*G06F 16/903*　　(2019.01)
　　*G06K 9/00*　　(2006.01)
　　*G09F 3/20*　　(2006.01)
　　*G06Q 30/02*　　(2012.01)
　　*G06K 19/06*　　(2006.01)
　　*H04L 29/08*　　(2006.01)
　　*H04W 4/02*　　(2018.01)
　　*G06Q 10/08*　　(2012.01)

(52) U.S. Cl.
　　CPC ............. *G06Q 30/02* (2013.01); *G08B 25/08* (2013.01); *G09F 3/204* (2013.01); *G06K 19/06028* (2013.01); *G06K 19/06037* (2013.01); *G06Q 10/08* (2013.01); *H04L 67/12* (2013.01); *H04W 4/023* (2013.01)

(58) Field of Classification Search
　　CPC .. G06K 19/06028; G06K 17/00; G06F 3/147; G06F 3/1446; G09G 2370/16; G09G 2370/025; G06Q 30/02; G06Q 30/06; G06Q 30/0641; B32B 2519/00
　　See application file for complete search history.

(56) References Cited

U.S. PATENT DOCUMENTS

| | | | |
|---|---|---|---|
| 5,532,465 A | 7/1996 | Waterhouse et al. | |
| 5,736,967 A | 4/1998 | Kayser et al. | |
| 5,841,365 A * | 11/1998 | Rimkus | G06K 7/0008 340/5.61 |
| 6,089,453 A | 7/2000 | Kayser et al. | |
| 6,181,299 B1 * | 1/2001 | Frederick | G06F 3/147 345/2.1 |
| 6,340,958 B1 * | 1/2002 | Cantu | G06F 3/147 235/383 |
| 6,550,673 B2 * | 4/2003 | Massaro | A47F 5/0068 235/383 |
| 6,622,410 B2 | 9/2003 | Wilkes et al. | |
| 6,750,769 B1 * | 6/2004 | Smith | G01S 13/751 340/572.1 |
| 6,993,498 B1 * | 1/2006 | Deaton | G06Q 20/20 705/14.23 |
| 7,152,040 B1 * | 12/2006 | Hawthorne | G06Q 10/087 705/16 |
| 7,213,751 B2 * | 5/2007 | Backlund | G06F 3/147 235/383 |
| 7,330,163 B2 * | 2/2008 | Nakai | G02F 1/1362 345/1.1 |
| 7,492,316 B1 * | 2/2009 | Ameti | G01S 5/0009 342/463 |
| 8,698,628 B2 | 4/2014 | Byun et al. | |
| 9,740,895 B1 * | 8/2017 | Liu | G06Q 10/00 |
| 2002/0190845 A1 * | 12/2002 | Moore | G06K 7/10336 340/10.3 |
| 2003/0136832 A1 * | 7/2003 | Massaro | A47F 5/0068 235/383 |
| 2004/0099736 A1 * | 5/2004 | Neumark | G01S 5/04 235/385 |
| 2005/0134461 A1 * | 6/2005 | Gelbman | G06K 7/10079 340/572.8 |
| 2006/0164247 A1 * | 7/2006 | Overhultz | A47F 10/02 340/572.1 |
| 2007/0018792 A1 * | 1/2007 | Taki | G01S 13/0209 340/10.1 |
| 2008/0197193 A1 * | 8/2008 | Overhultz | G06Q 10/02 235/383 |
| 2009/0295592 A1 * | 12/2009 | Mizukawa | G06F 3/147 340/691.5 |
| 2011/0102155 A1 * | 5/2011 | Choi | G06Q 30/06 340/10.6 |
| 2012/0044056 A1 | 2/2012 | Byun et al. | |
| 2012/0072137 A1 * | 3/2012 | Rathke | H04B 3/46 702/57 |
| 2012/0126982 A1 * | 5/2012 | Lee | G06Q 30/06 340/572.1 |
| 2012/0133488 A1 * | 5/2012 | Choi | G06K 7/10079 340/10.1 |
| 2013/0207831 A1 | 8/2013 | Fullerton | |
| 2014/0263636 A1 | 9/2014 | Jones et al. | |
| 2016/0125211 A1 * | 5/2016 | Hattori | G06Q 10/06 340/10.1 |
| 2016/0132822 A1 * | 5/2016 | Swafford | H04W 4/80 705/28 |
| 2016/0134930 A1 * | 5/2016 | Swafford | A47F 5/0068 725/80 |
| 2016/0314327 A1 * | 10/2016 | Butler | H04L 67/1097 |

\* cited by examiner

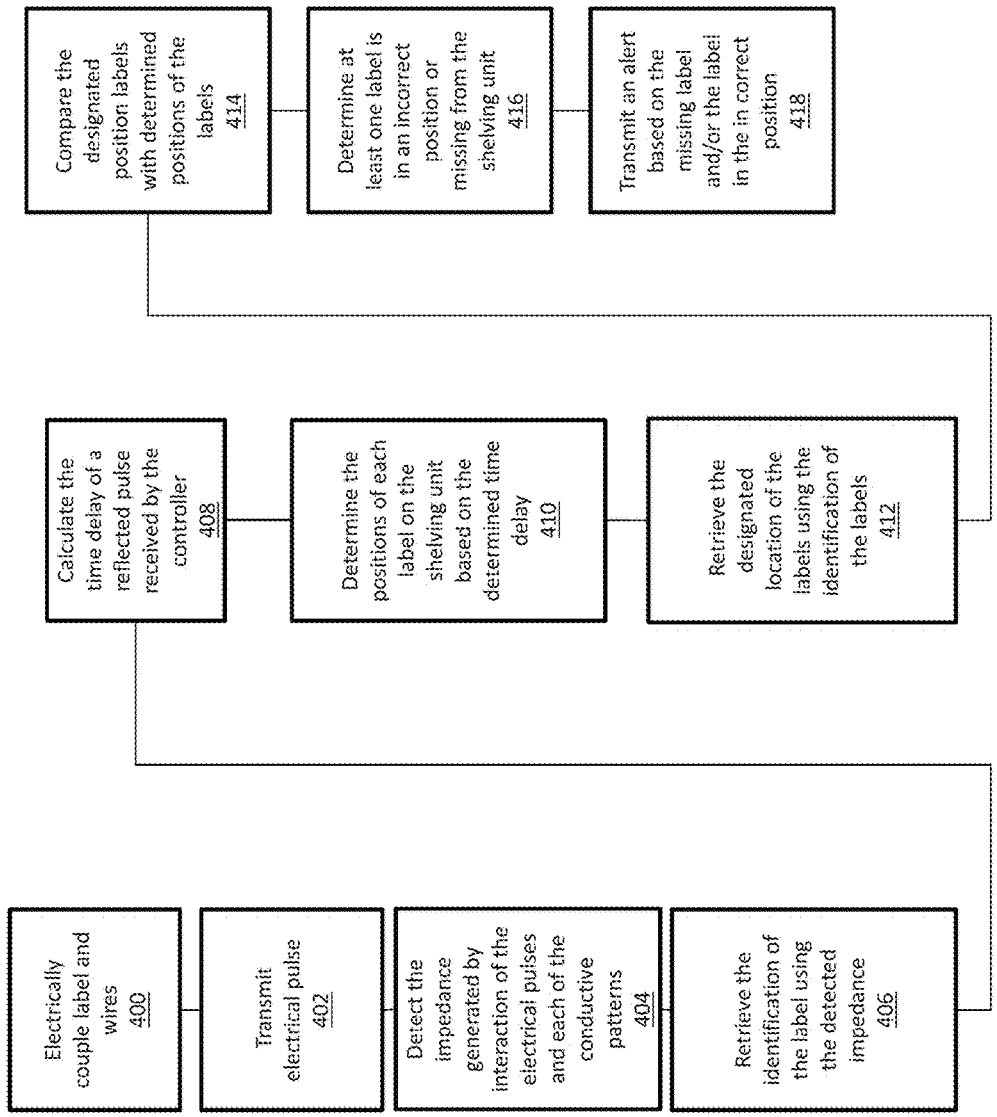

SYSTEMS AND METHODS FOR DETERMINING LABEL POSITIONS

CROSS-REFERENCE TO RELATED PATENT APPLICATIONS

This application claims priority to U.S. Provisional Application No. 62/427,537 filed on Nov. 29, 2016, the content of which is hereby incorporated by reference in its entirety.

BACKGROUND

Large facilities can store many physical objects. Labels can identify the physical objects. Accordingly, it is important the physical objects and labels are in the correct position.

BRIEF DESCRIPTION OF DRAWINGS

Illustrative embodiments are shown by way of example in the accompanying drawings and should not be considered as a limitation of the present disclosure:

FIG. 4 is a flowchart illustrating a label position determination system based on a received identifier according to exemplary embodiments of the present disclosure.

DETAILED DESCRIPTION

Described in detail herein are systems and methods generating labels and determining label positions on shelves based on passive electrical characteristics of the generated labels. In exemplary embodiments, a label position determination system can include labels mounted on the front face of the shelving units. The labels can include conductive patterns made up of conductive materials on the back face of the label and machine-readable elements on the front face of the labels. The machine-readable elements can be encoded with identifiers associated with physical objects disposed on the shelving unit. The conductive patterns of the labels can be electrically coupled with electrically conductive wires extending along a front face of a shelf. The system can further include a controller coupled to with electrically conductive wires, configured to transmit electrical pulses through the electrically conductive wires. The controller can determine at least one of: an identity of each of the labels mounted to the front face, whether a label has been mounted at an incorrect location on the front face of the shelf, or whether a label is missing from the front face of the shelf based on a response to the electrical pulse.

The controller can detect an impedance of each of the conductive patterns based on an interaction of the electrical pulse and each of the conductive patterns and identify each label by querying a database using the detected impedance. The conductive patterns are formed to create parallel electrical connections or series connections with the electrically conductive wires to alter the effective impedance of the electrically conductive wires. The conductive patterns can generate a unique impedance. The controller can further calculate a time delay or total time of travel of a reflected pulse received by the controller in response to transmission of the electrical pulse by the controller, determine a position of the at least one of the labels along the front face of the shelf is incorrect and transmit an alert in response to determining the position of the at least one of the labels is incorrect. The controller can calculate the time delay by determining the time period between transmission of the electrical pulse and a reflection of the electrical pulse from a location at which at least one of the labels is mounted. The controller can calculate the position of the labels by based on the determined time period.

Figure 1A:
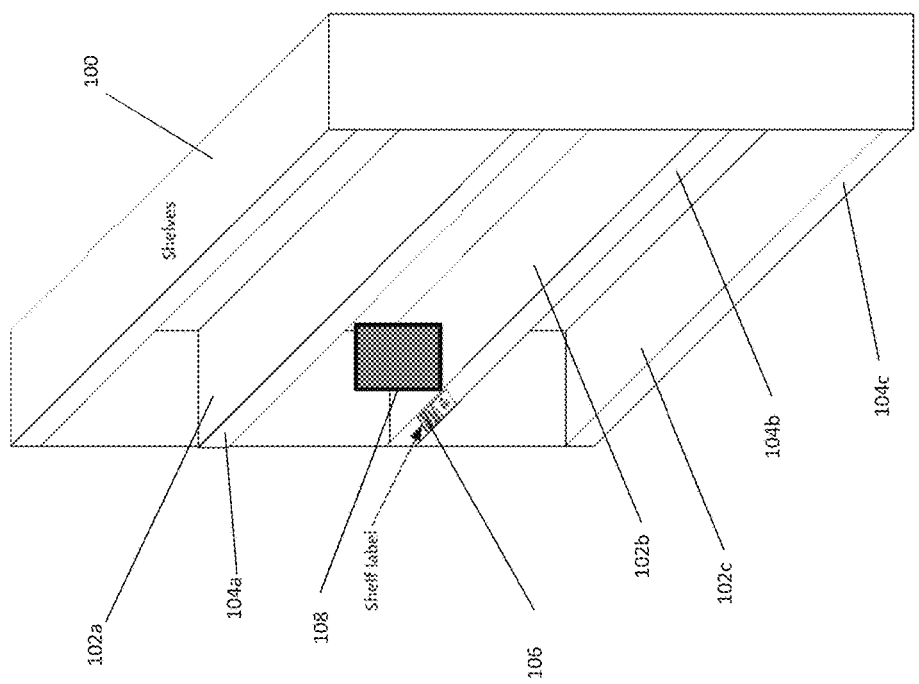
FIG. 1A is a diagram of a shelving unit 100 disposed in a facility according to the present disclosure.

FIG. 1A is a diagram of a shelving unit 100 disposed in a facility according to the present disclosure. The shelving unit 100 can include shelves 102a-c and each of the shelves can include front portions/faces 104a-c. The front portions 104a-c can be disposed at a predetermined angle. Physical objects 108 can be disposed on the shelves 102a-c. A label 106 can be disposed on the front portion of the shelf 104b. The label 106 can include a machine-readable element on the front face of the label. The machine-readable element can be encoded with an identifier associated with the physical objects 108. The machine-readable element can be a barcode or QR code. The label 106 can be disposed at a predetermined position on the front portion of the shelf 104b proximate to the physical objects 108. The back face of the label can include conductive patterns. Each of the different labels can include a different conductive pattern.

Figure 1B:
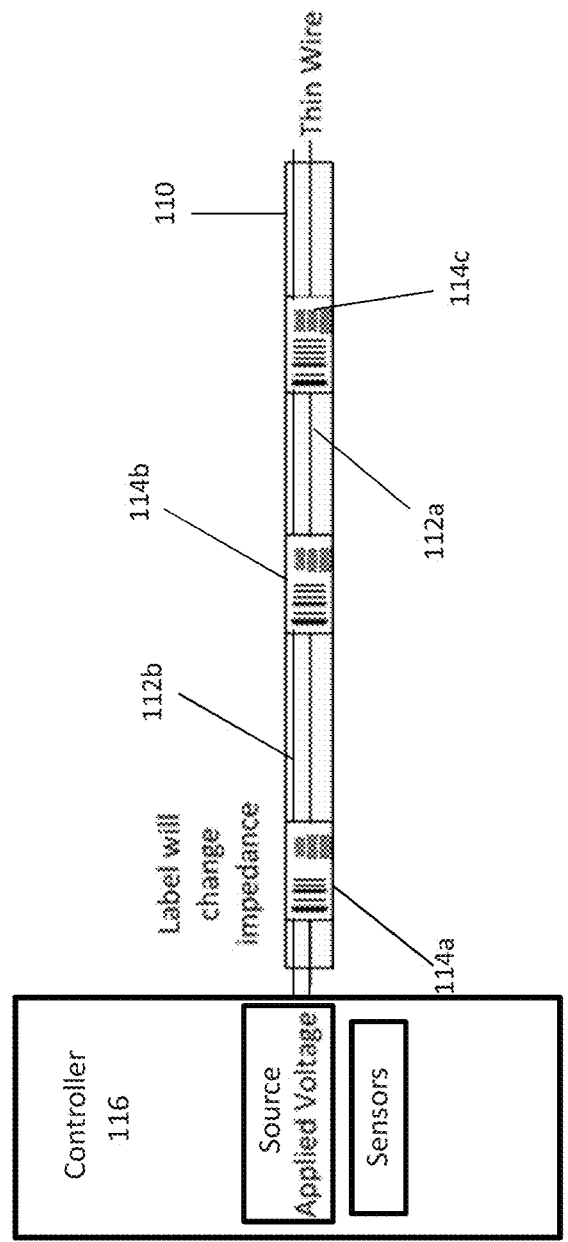
FIG. 1B is a diagram of wires disposed behind the labels along a front facing portion of the shelving unit according to embodiments of the present disclosure.

FIG. 1B is a schematic diagram of a wire 112 disposed behind the labels 114a-c disposed on the front facing portion 110 of the shelving unit according to the present disclosure. In exemplary embodiments, one or more wires 112a-b can be disposed on the front facing portion 110 of the shelving unit (as shown in FIG. 1A). The one or more wires 112a-b can be electrically conductive wires. The labels 114a-c can include machine-readable elements on the front face of the labels 114a-c and a conductive pattern formed by a conductive material on the back face of the label. Each of the machine-readable elements can be encoded with different identifiers representing different sets of like physical objects. Each of the labels can have different conductive patterns disposed on the back face of the label. The one or more wires 112a-b can form a parallel or series electrical connections with the labels 114a-c. The one or more wires 112a-b can be coupled to a controller 116 which includes a source applied voltage and sensors.

In exemplary embodiments, a voltage in the form of one or more electrical pulses from the source applied voltage in the controller 116 can be applied to the one or more wires 112a-b. The one or more electrical pulses can travel through the wires and interact with the conductive patterns on the back of the labels 114a-c. An impedance of the conductive patterns can affect the effective resistance of an electric circuit formed by the wires and the conductive patterns. The impedance can differ based on the different conductive patterns on the labels and can be unique to each label based on the conductive pattern. The sensors in the controller 116 can detect the impedance. For example, the impedance of the conductive pattern on the back face of the label 114a-c where each label 114a-c can have a conductive pattern that forms a different impedance. For example, the conductive pattern on the label 114a can have an impedance that is different than the impendence of the conductive pattern on the label 114b.

As mentioned above, the wire can form a parallel or series electrical connections with the conductive pattern on the back face of the label. In the event, the electrical connection is a series circuit, the one or more electrical pulses can travel in a single path through the conductive pattern of a label. In the event, the electrical connections is a parallel connection, the one more electrical pulses can travel in multiple paths through the wire and the conductive pattern of a label. The one or more electrical pulses can travel through each conductive pattern electrically coupled to the wire(s) and return to the first end to form a closed loop circuit.

Figure 1C:
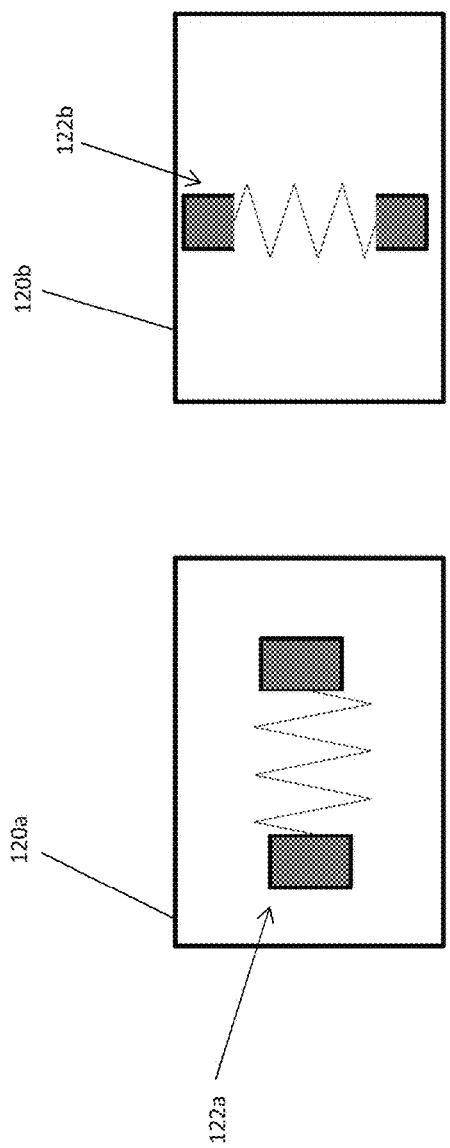
FIG. 1C is a schematic diagram of the back face of example labels according to embodiments of the present disclosure.

FIG. 1C is a schematic diagram of the back face of the labels according to the present disclosure. As mentioned above, the back face of the labels 120a-b can include conductive patterns 122a-b. The conductive pattern 122a can be different than conductive pattern 122b. The conductive patterns 122a-b can be formed by conductive material that conducts electrical energy. Accordingly, the different conductive patterns 122a-b can have different impedances. The conductive patterns 122a-b can create series and/or parallel electrical connections with the one or more wires on the shelving units to alter the effective impedance of the at least one or more wires.

Figure 1D:
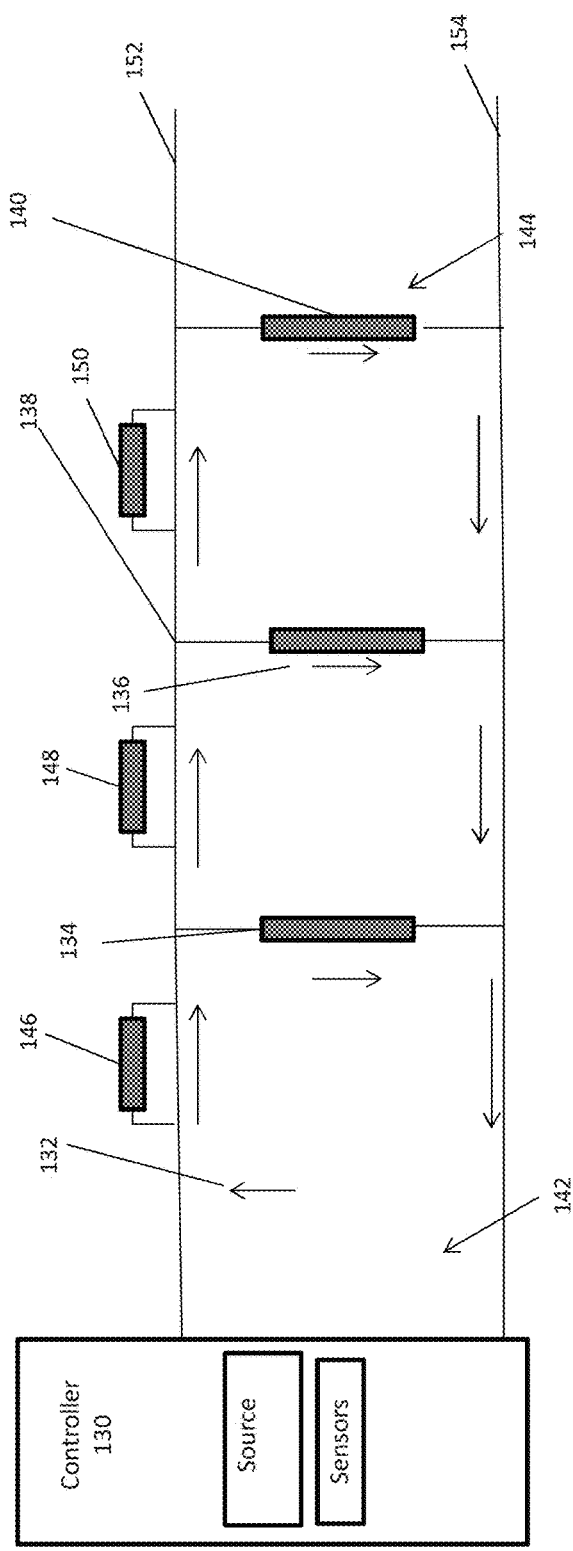
FIG. 1D is a schematic diagram of an electrical circuit formed using labels according to embodiments of the present disclosure.

FIG. 1D is a schematic diagram of an electrical circuit formed by mounting labels on the shelf, where the conductive patterns on the back faces of the labels electrically couple to one or both of the wires 152-154 based on the layout of the conductive pattern according to embodiments of the present disclosure. As mentioned above the one or more wires 152-154 disposed on the front face of the shelving unit can be used to form an electrical circuit 138 with the labels. The electrical circuit 138 can include a controller 130 which includes a source power supply and sensors at a first end 142. The electrical circuit 138 can further include labels 134, 136, 140, 146-150 that can be disposed along the front face of the shelf such that the conductive patterns on the back faces of labels electrically couple to one or both of the wires 152-154 forming the electrical circuit 138. The passive conductive patterns on the back face of the labels 134, 136 and 140 can cause the labels to form series connections between the wires 152-154, where each of the labels 134, 136, and 140 are in parallel to each other, and the conductive patterns on the back face of the labels 146-150 can cause the labels to form parallel connection with one of the wires 152-154. In exemplary embodiments, the labels can be generated such that their correct placement on front face of a shelf forms the electrical circuit 138 with alternating series and parallel connections based on the layouts of conductive patterns of the back faces of the labels.

One or more electrical pulses can be generated by the power source in the controller 130 and can travel in the direction indicated by the arrows 132. For example, the one or more electrical pulses can travel from the power supply from the first end 142 of the electrical circuit to the second end 144 and interact with the back face of each label 134, 136, 140, 146-150. Each of the electrical pulses can be reflected back to the controller 130 in response to interacting with the conductive pattern on the back face of each label 134, 136, 140, 146-150. The controller 130 can further calculate the time delay of a reflected pulse received by the controller in response to the transmission of the electrical pulse by the controller 130. Based on the time delay the controller 130 can calculate the distance the label is positioned from the controller 130.

The sensors in the controller 130 can detect or sense the impedances of the conductive patterns based on the one or more electrical pulse interacting with the conductive patterns on the back face of each label 134, 136, 140, 146-150. As mentioned above, a unique conductive pattern can be formed on the back face of each label 134, 136, 140, 146-150 such that the impedance of each conductive pattern can be different. The controller 130 can transmit the calculated time delay and the detected impedances to a remote computing system.

Figure 2:
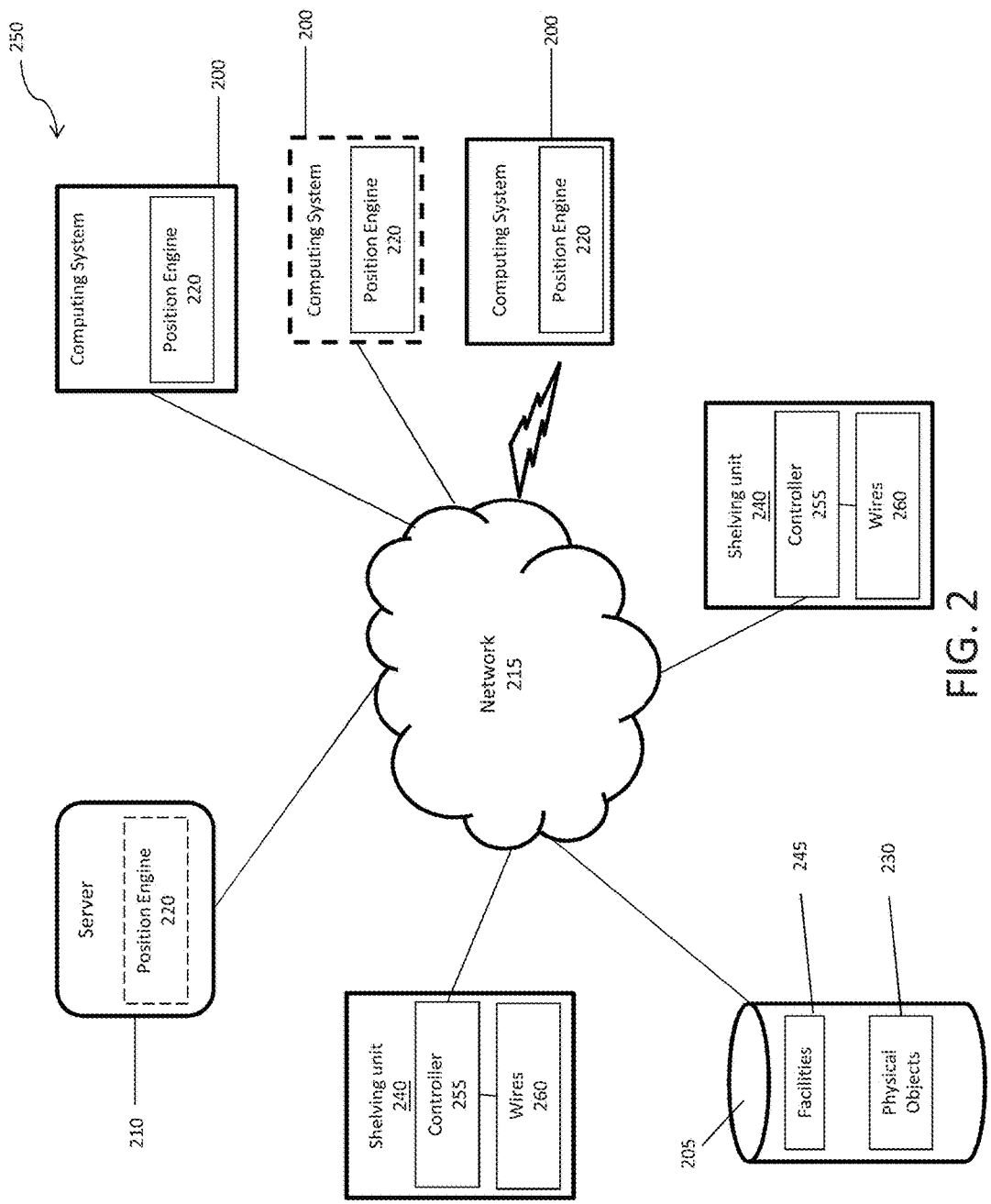
FIG. 2 illustrates an exemplary label position determination system in accordance with exemplary embodiments of the present disclosure.

FIG. 2 illustrates an exemplary label position determination system 250 in accordance with exemplary embodiments of the present disclosure. The label position determination system 250 can include one or more databases 205, one or more servers 210, one or more computing systems 200, and shelving units 240. The shelving units 240 can include a controller 255 and one or more wires 260. In exemplary embodiments, the computing system 200 can be in communication with the databases 205, the server(s) 210, and the controller 255 via a communications network 215. The computing system 200 can implement at least one instance of a position engine 220 configured to implement label position determination system 250.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components of the computing system 200 and/or facilitates access to the content of the databases 205. In some embodiments, the server 210 can host the position engine 220 or portions thereof. The databases 205 may store information/data, as described herein. For example, the databases 205 can include a physical objects database 230 and the facilities database 245. The physical objects database 230 can store physical objects disposed in a facility. The facilities database 245 can include information associated with the facility including designated positions of labels throughout the facility. The databases 205 and server 210 can be located at one or more geographically distributed locations from each other or from the computing system 200. Alternatively, the databases 205 can be included within server 210.

In exemplary embodiments, shelving units 240 storing physical objects can be disposed in a facility. A set of labels can be disposed on the front facing portion of the shelving units 240 and wires 260 can be disposed underneath the labels. The wires 260 can be electrically conductive wires. The labels can have conductive patterns disposed on the back face of the labels and the conductive patterns can be in contact with the wires. The wires 260 can form a parallel or series electrical circuit with the conductive patterns of the labels.

The computing system 200 can execute the position engine 220. The position engine 220 can instruct the controller 255 to transmit an applied voltage in the form of one or more electrical pulse to the wires 260. An impedance can be altered when the one or more electrical pulses comes interacts with the conductive pattern. The impedance can vary based on the differing conductive pattern on each label. The controller 255 can detect impedance altered by the conductive pattern of each label. Each conductive pattern can generate a unique impedance when interacting with the wire. The controller 255 can transmit the detected impedance to the position engine 220. The position engine 220 can identify each label by querying the facilities database 245 using the impedance generated by the conductive pattern of the label.

The controller 220 can further calculate the time delay of a reflected pulse received by the controller in response to the transmission of the electrical pulse by the controller. As mentioned above, the labels can be disposed along the electrical circuit in a fashion which alternates the electrical circuit from a parallel to series circuit. The controller 220 can determine the time delay of an electrical pulse reflecting off of a label and returning to the power supply. Furthermore, the conductive patterns can alter the effective impedance of the wires 260. The controller 255 can transmit the impedance and time-delay to the position engine 220. Based on the calculated time-delay the position engine 220 can determine the position of each label on the shelving unit. For example, the position engine 220 can determine travel time of the one or more electrical pulses to the label, and based on the length of the wires 260 the position engine 220 can determine the position the label is disposed on the shelf.

Figure 3:
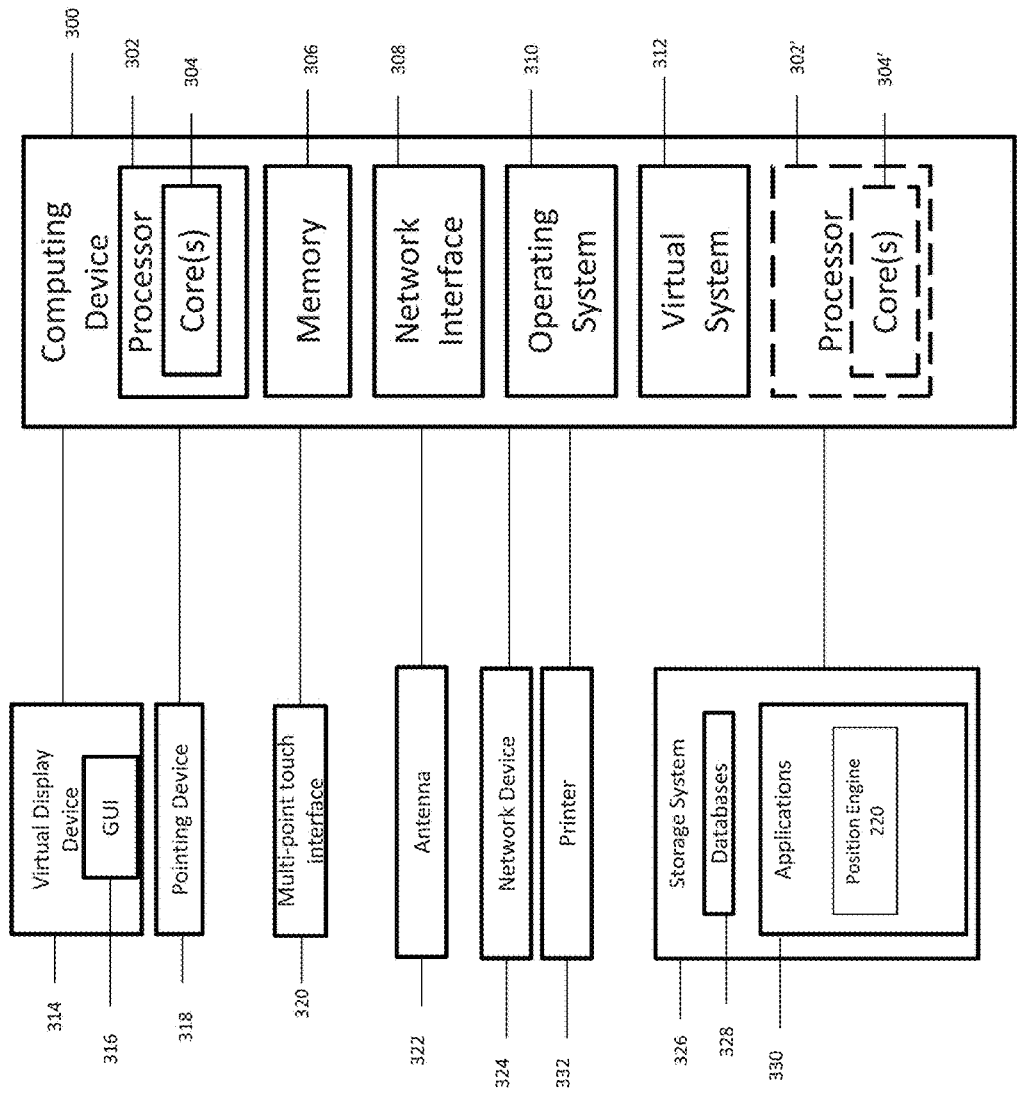
FIG. 3 illustrates an exemplary computing device in accordance with exemplary embodiments of the present disclosure.

The position engine 220 can query the facilities database 245 using the detected impedance to determine the designated position of the labels. In some embodiments, the labels can be printed by a label printer (e.g., as shown in FIG. 3) in a predetermined order such that specific labels have specific conductive patterns on them. Based on the order that the labels are printed, the impedance of the conductive pattern on each of the labels can be stored in the facilities database 245. For example, a first label can be printed and associated with a first conduct pattern (having a first impedance), and the association between the first label and first conductive pattern can be stored. Additionally, the location along a shelf that the labels are to be positioned can be associated with the labels, and therefore, can be associated with the conductive patterns on the labels such that the system can determine where a label is supposed to be placed (e.g., based on an association between the label and the designated location) and whether that label is actually placed there (e.g., based on the impedance of the conductive pattern on the label). Furthermore, the physical objects to which the impedance is correlated can also be stored in the facilities database 245.

In some embodiments, a label printer can determine the impedance of conductive patterns on the labels as it prints the labels and/or can print the conductive patterns on each of the label as the label is printed, and the facilities database 245 can be updated with the printed and/or determined impedance, the correlated physical objects, and the location at which the label is supposed to be placed on a shelf.

The position engine 220 can compare the determined position of the labels with the designated position of the labels and determine whether a label in the incorrect position on the shelving unit. The position engine 220 in response to determining a label is in the incorrect position. In some embodiments, the position engine 220 can determine a label is missing from the shelving unit based on not detecting an expected generated impedance. For example, the position engine 220 can receive from the controller 255 a first impedance generated by a first conductive pattern of a first label and a second impedance generated by a second conductive pattern of a second label. The position engine 220 can also determine the position of the first and second labels based on the time-delay of the one or more electrical pulses traveling to the first and second label, received from the controller 255. The position engine 220 can query the facilities database 245 to retrieve the identification of the first and second labels and the designated positions of the first and second labels. The position engine 220 can determine a label is designated to be disposed between the first and second label based on the positions of the first and second labels. The position engine 220 can determine the label is missing because the impedance of the missing label was not detected by the controller 255. The position engine 220 can transmit an alert in response to determining a label was missing from the shelving unit.

As a non-limiting example, the label position determination system 250 can be implemented in a retail store. Products for sale can be disposed on shelving units 240 throughout the retail store. The shelving units 240 can have product labels disposed on the front facing portion of the shelving unit 240. The labels can include machine-readable elements encoded with identifiers associated with physical objects on the shelving units. Each identifier can be unique to each set of like physical objects. The labels can be disposed at a specific location of the shelving unit 240, proximate to the set of like physical objects for which the label includes the machine-readable element encoded with the identifier associated with the set of like physical objects. The labels can have conductive patterns on the back face. Wires 260 can be disposed along the front facing portion of the shelving unit behind the labels interacting with the conductive patterns. The conductive patterns can create an electrical circuit with the wires 260 to alter an effective impedance of the wires 260.

The position engine 220 can instruct the controller 255 to transmit one or more electrical pulses through wires 260. The conductive patterns of the labels can generate a unique impedance in response to interacting with the one or more electrical pulses. The controller 255 can detect the unique impedance for each label. The controller 255 can query the facilities database 245 to determine the identification of the label. The controller 255 can also detect the time delay of a reflected one or more electrical pulse. The controller 255 can transmit the time-delay and impedance to the position engine 220. The position engine 220 can determine the time period between transmission of the one or more electrical pulse and a reflection of the electrical pulse from a location of each of the labels. The position engine 220 can determine the position of each of the labels based on the transmission time period of the electrical pulse to the label. The position engine 220 can query the facilities database 245 to retrieve the designated locations of the labels. The position engine 220 can retrieve a planogram of the retail store. The planogram can include all the designated locations of the products for sale along with the labels for the products. The position engine 220 can compare the designated locations of the labels to the determined positions of the labels. The position engine 220 can determine a label is missing or in the incorrect position in response to comparing the designated locations and the determined positions of the labels. The position engine 220 can transmit an alert to an employee of the retail store regarding the missing label or a label in an incorrect position.

FIG. 3 is a block diagram of an example computing device 300 for implementing exemplary embodiments of the present disclosure. Embodiments of the computing device 300 can implement embodiments of the position engine 220. The computing device 300 can communicate with the controller on the shelving units to transmit electrical pulses and to receive the detected time-delay and impedance. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the position engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 and a pointing device 318. The computing device 300 can also include a printer 332. The printer 332 can be configured to print labels in response to instructions from the processing device 302. For example, in exemplary embodiments, the printer 332 can print labels that include machine-readable elements encoded with unique identifiers on a first side of the label and/or that include conductive patterns on a second side of the label, as described herein.

The computing device 300 may also include one or more storage devices 326, such as a hard-drive, CD-ROM, or other computer readable media, for storing data and computer-readable instructions and/or software that implement exemplary embodiments of the present disclosure (e.g., applications 330 e.g. the controller 220). For example, exemplary storage device 326 can include one or more databases 328 for storing information regarding the physical objects and labels. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

FIG. 4 is a flowchart illustrating a process implemented by an label position determination system according to exemplary embodiments of the present disclosure. In operation 400, labels (e.g. labels 106 and 114*a-c* as shown in FIGS. 1A-B) disposed on the front facing portion (e.g. front facing portion 104*a-c* and 110 as shown in FIGS. 1A-B) of a shelving unit (e.g. shelving unit 100 and 240 as shown in FIGS. 1A and 2) can be electrically coupled with one or more wires (e.g. wires 112*a-b*, 152-154 and 260 as shown in FIGS. 1B, 1D and 2) also disposed on the front facing portion of the shelving unit. The labels can include machine-readable elements encoded with identifiers associated with physical objects (e.g. physical objects 108 as shown in FIG. 1A). The labels can have passive conductive patterns (e.g. conductive patterns 122*a-b* as shown in FIG. 1C) on the back face (e.g. back face 120*a-b* as shown in FIG. 1C) of the labels. The conductive patterns of the labels can be electrically coupled with the wires. The conductive patterns can create parallel and series electrical connections with the wires. The computing system (e.g. computing system 200 as shown in FIG. 2) can execute the position engine (e.g. position engine 220 as shown in FIG. 2) In operation 402, a controller (e.g. controller 116, 130 and 255 as shown in FIGS. 1A, 1D and 2) can transmit one or more electrical pulses through the wires.

In operation 404, the controller can detect an impedance generated by each of the conductive patterns based on an interaction of the one or more electrical pulses and each of the conductive patterns. The conductive patterns can alter the effective impedance of the wires. The generated impedance can be unique for each label based on the conductive pattern of the label. In operation 406, the controller can query the facilities database (e.g. facilities database 245 in FIG. 2) to retrieve the identification of the label using the detected impedance. In operation 408, the controller can calculate the time delay of a reflected pulse received by the controller. The controller can calculate the time delay by determining the time period between transmission of the electrical pulse and a reflection of the electrical pulse from a location of each label on the shelving unit. The controller can transmit the detected time-delay and impedance to the position engine. In operation 410, in response to receiving the time delay the position engine can determine the positions of each label on the shelving unit based on the determined time delay for each label on the shelving unit. In operation 412, the position engine can query the facilities database to retrieve the designated location of the labels using the identification of the labels as determined based on the impedances of the conductive patterns on the labels. In operation 414, the position engine can compare the designated position labels with determined positions of the labels. In operation 416, the position engine can determine at least one label is in an incorrect position or missing from the shelving unit based on the comparison. In operation 418, the position engine can transmit an alert based on the missing label and/or the label in the in correct position.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A label position monitoring system, the system comprising:
a shelving unit disposed in a facility having a shelf with a front face;
a plurality of electrically conductive wires extending along the front face of the shelf;
a set of labels configured to be disposed along the front face of the shelf, each of the labels having a front surface that includes a machine-readable element and a back surface upon which one of a plurality of passive conductive patterns is disposed, each one of the plurality of passive conductive patterns on the back surface of each of the labels has an impedance and is configured to electrically couple to at least one of the plurality of conductive wires to generate different circuits with different effective impedances, where the different circuits and the effective impedances change based on a number of labels coupled to the plurality of conductive wires;
a controller electrically coupled to the plurality of electrically conductive wires, the controller being configured to:
transmit an electrical pulse through a generated one of the different circuits; and
determine, based on a response of the electrical pulse to the change in effective impedances of the generated one of the different circuits, at least one of (i) an identity of each label mounted to the front face, (ii) at least one of the labels from the set has been mounted at an incorrect location on the front face of the shelf, or (iii) at least one of the labels is missing from the front face of the shelf.

2. The system of claim 1, wherein the controller is in communication with an impedance database configured to store impedances of the different circuits based on the location of the label in the facility, and the controller is further configured to:
detect an impedance of the different circuits based on an interaction of the electrical pulse and the different circuits; and
query impedance database to identify each label by comparing the detected impedance of the different circuits with the stored impedance of the different circuits.

3. The system of claim 1, wherein the controller is further configured to:
calculate the time delay of a reflected pulse received by the controller in response to transmission of the electrical pulse by the controller;
calculate a position of the at least one of the labels based on the time delay;
determine that the position of the at least one of the labels is incorrect; and
transmit an alert in response to determining the position of the at least one of the labels is incorrect.

4. The system of claim 3, wherein to change the effective impedance of the different circuits based on the location of the label in the facility, the plurality of passive conductive patterns are formed to create parallel electrical connections with at least one of the plurality of electrically conductive wires to alter an effective impedance of the at least one of the plurality of electrically conductive wires.

5. The system of claim 4, wherein calculating the time delay further includes determining a time period between transmission of the electrical pulse and a reflection of the electrical pulse from a location at which at least one of the labels is mounted.

6. The system of claim 5, wherein calculating the position of the at least one of the labels along the front face of the shelf is based on the time period.

7. The system of claim 6, wherein a planogram of the facility including the designated positions of each label is stored in the database.

8. The system of claim 7, wherein determining the position of the at least one label is incorrect further includes querying the database to retrieve the planogram, comparing the determined position of the at least one label with the designated position of the label in the planogram.

9. The system of claim 8, wherein each of the conductive patterns generates a unique impedance for each label.

10. The system in claim 9, wherein the controller is further configured to query the database to identify the label based on the unique impedance.

11. A label position monitoring method, the method comprising:

electrically coupling, labels along a front face of a shelf of a shelving unit, each of the labels having a front surface that includes a machine-readable element and a back surface upon which one of a plurality of passive conductive patterns is disposed, each one of the plurality of passive conductive patterns on the back surface of each of the labels having an impedance and being electrically coupled to at least one of a plurality of electrically conductive wires extending along a front face of a shelf to generate different circuits with different effective impedances, where the different circuits and the effective impedances change based on a number of labels coupled to the plurality of conductive wires;

transmitting, via a controller electrically coupled to the plurality of electrically conductive wires an electrical pulse through a generated one of the different circuits;

determining, based on a response to the electrical pulse to the change in effective impedances of the generated one of the different circuits, via the controller, at least one of: an identity of each of the labels mounted to the front face, at least one of the labels has been mounted at an incorrect location on the front face of the shelf, or at least one of the labels is missing from the front face of the shelf.

12. The method of claim 11, further comprising:

detecting, via the controller, an impedance of the different circuits based on an interaction of the electrical pulse and the different circuits; and querying, via the controller, an impedance database, to identify each label by comparing the detected impedance of the different circuits with the stored impedance in the impedance database for different circuits based on the location of the label in the facility.

13. The method of claim 12, further comprising:

calculating, via the controller, a time delay of a reflected pulse received by the controller in response to transmission of the electrical pulse by the controller;

determining, via the controller, a position of the at least one of the labels along the front face of the shelf is incorrect; and transmitting, via the controller, an alert in response to determining the position of the at least one of the labels is incorrect.

14. The method of claim 13, wherein to change the effective impedance of the different circuits based on the location of the label in the facility, the plurality of passive conductive patterns are formed to create parallel electrical connections or series electrical connections with at least one of the plurality of electrically conductive wires to alter an effective impedance of the at least one of the plurality of electrically conductive wires.

15. The method of claim 14, further comprising calculating the time delay further by determining a time period between transmission of the electrical pulse and a reflection of the electrical pulse from a location at which at least one of the labels is mounted.

16. The method of claim 15, further comprising calculating, via the controller, the position of the at least one of the labels along the front face of the shelf is based on the time period.

17. The method of claim 16, wherein a planogram of the facility including the designated positions of each of the labels is stored in the impedance database.

18. The method of claim 17, wherein determining the position of the at least one of the labels is incorrect further comprising querying, via the controller, the impedance database to retrieve the planogram, comparing the determined position of the at least one of labels with the designated position of the at least one of the labels in the planogram.

19. The method of claim 18, further comprising generating, via each of the conductive patterns, a unique impedance for each of the labels.

20. The method of claim 19, further comprising querying, via the controller, the impedance database to identify each of the labels based on the unique impedance.

* * * * *